March 21, 1961 S. E. ROSE 2,975,634
FREQUENCY-COMPENSATED FLOWMETER SYSTEM
Filed Aug. 17, 1955

INVENTOR.
STANLEY E. ROSE
BY Leonard H. King
AGENT

United States Patent Office 2,975,634
Patented Mar. 21, 1961

2,975,634

FREQUENCY-COMPENSATED FLOWMETER SYSTEM

Stanley E. Rose, East Meadow, N.Y., assignor to Avien, Inc., Woodside, N.Y.

Filed Aug. 17, 1955, Ser. No. 528,973

6 Claims. (Cl. 73—194)

This invention relates to apparatus for the gravimetric measurement of liquid quantity.

The measurement of sizeable quantities of flowing liquid with accuracy is a difficult problem. In certain aeronautical applications this difficult task is rendered even more complex by the environment. In one application, that of metering fuel transferred in mid-air from an airborne tanker aircraft to a second aircraft the fueling rate may be as high as 800,000 pounds per hour. This rate is far above the capability of conventional metering devices.

In still a different application there is a requirement for improved fuel quantity measuring apparatus suitable for use with odd shaped storage cells. For example the thinness and shape of advanced design supersonic fighter aircraft wings may require an unreasonable number of fuel tank probes if capacitance type gages are used. A study of a typical supersonic fighter revealed that over seventy wing probes would be required. Beside this large quantity of probes, other complications appeared such as the inaccessibility of the probes and probe connecting wires within the wing.

By way of contrast, the device of this invention may be readily installed in the existing fuel lines of an aircraft at the point where they emerge from the wing into the fuselage thus avoiding installing in the wing of any additional equipment exclusively for fuel quantity gaging. Being located in the fuselage, the instruments are readily available for servicing.

When the unit is employed as a fuel quantity gage, it acts as a bidirectional flowmeter. The device counts the pounds of fuel pumped into say, the wing tank. As fuel is used or transferred to fuselage tanks, the instrument counts the pounds of fuel removed from the tank, subtracts it from the total and shows, on a suitable indicator the quantity of fuel remaining in the tank.

For aircraft use it is important that equipment be rugged, compact and light in weight.

Briefly stated, the apparatus of this invention includes two wheels through which the flow of fuel is channeled. One wheel, the impeller wheel is driven by a synchronous motor and the other wheel, a sensing wheel is geared to a torque motor.

In the case of a bidirectional unit, such as a flowmeter used as a fuel quantity gage, three wheels are used, two as impellers and one for sensing.

The impeller wheel imparts angular momentum to fuel passing through it. This impinges on the sensing wheel tending to rotate it and buck the torque motor to which it is geared.

If the motor's torque does not equal the torque developed in the sensing wheel, a net torque results which rotates a gear train. A pick-off potentiometer, driven by the gear train, provides a voltage which is related to flow rate. This voltage is amplified and fed back to the torque motor to produce a torque which exactly balances the sensing wheel torque. This same voltage, being directly proportional to flow rate, is used to actuate an indicating means. The signal may be integrated to show total quantity.

It is to be noted that the apparatus of this invention measures actual mass whereas flowmeters in general are volumetric devices. The pilot of an airplane is concerned with the energy value of his fuel supply as represented by its weight rather than its volume.

Accordingly, it is an object of this invention to provide an accurate high rate flowmeter.

It is another object of this invention to provide a lightweight flowmeter.

It is a particular object of this invention to provide a flowmeter capable of accurate indication and which does not require an accurately regulated power source.

A further object of this invention is to provide an improved liquid quantity measuring system.

Still a different object is to provide a true mass measuring flowmeter.

Another object of this invention is to provide a flowmeter driven by a synchronous motor.

An object of this invention is to provide a flowmeter which may be equipped with remotely located indicating means.

Still other objects, advantages and desirable features of the invention will become apparent from the following description and by reference to the following drawings, in which:

Figure 2 shows partly pictorially and partly schematically a flowmeter with a portion of the housing cut-away so as to expose impeller and sensing wheels and other elements of the device.

Like reference characters are used in the drawings to refer to like elements.

Figure 1:
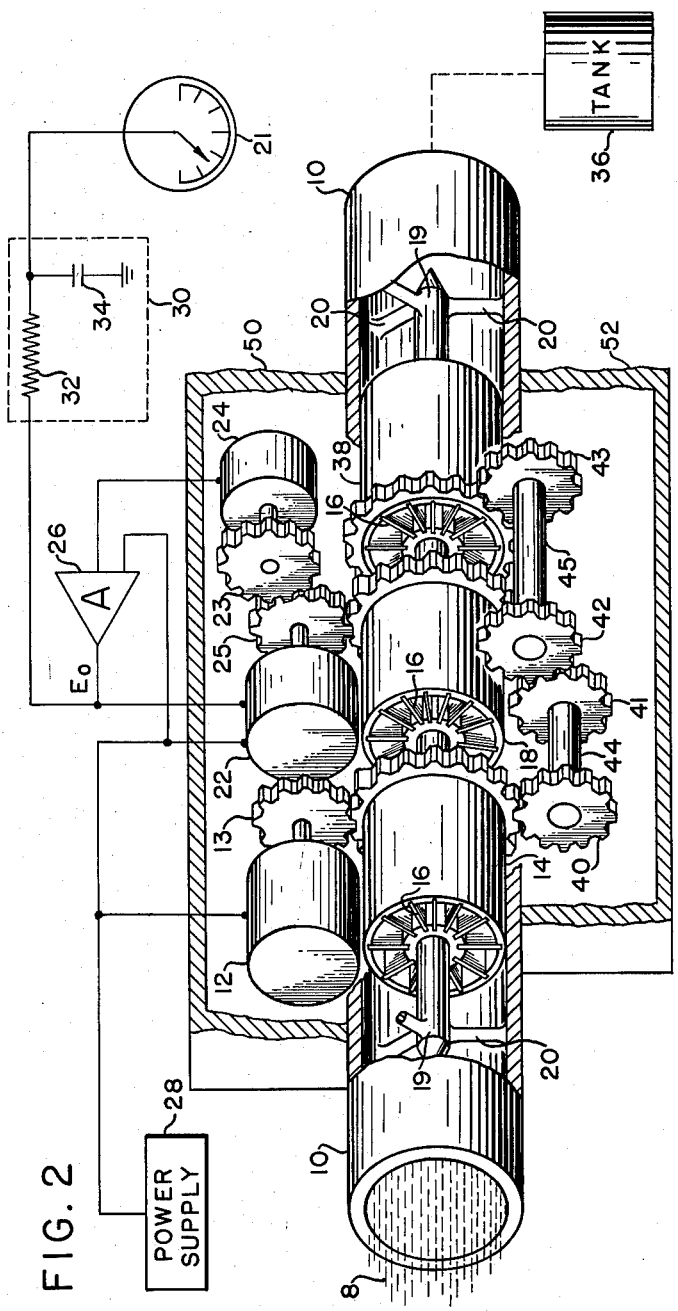
Figure 1 shows the vector relationship of the velocity of the liquid passing through the impeller wheel and sensing wheel of the flowmeter.
Figure 1:
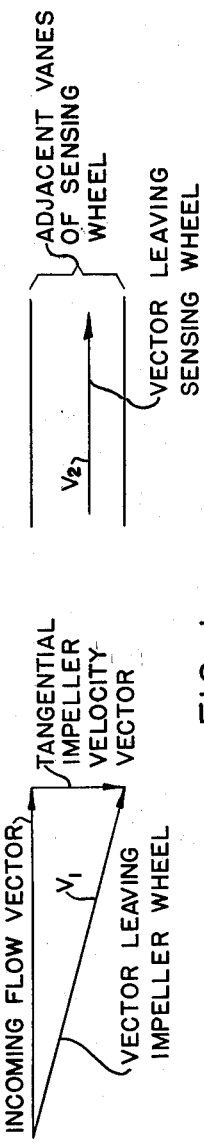

The principle of operation of the true mass flowmeter of this invention is the utilization of signal torques resulting from the conservation of the moment of momentum. This principle is embodied by imparting an angular momentum to the mass influx of fluid 8 through the conduit formed by housing 10 by means of an impeller wheel 14 driven by a synchronous motor 12 through gear 13. The blades 16 are mounted in a hub at zero degrees angle of incidence with respect to the direction of flow. This moment of momentum is then extracted from the fluid 8 by means of a second wheel 18 which serves as a sensing wheel. Wheels 14 and 18 are supported by means of low friction bearings (not shown) from shaft 19. In turn shaft 19 is supported by fins 20.

The torque exerted on wheel 18 is found in practice to be proportional to the mass flow rate in accordance with the following derivation.

By the impulse-momentum principle $$F dt = d(MV) \qquad (1)$$

The force required for a change in momentum from $V_1$ to $V_2$ velocity vectors shown in Figure 2 is $$F = \rho q (V_2 - V_1) \qquad (2)$$

where $\rho$ is the mass density $q$ is the volumetric flow rate thru one set of vanes and $(V_2 - V_1)$ is the vector subtraction of the velocity vectors shown.

But $$V_2 - V_1 = rw \qquad (3)$$

where $r$ is the geometric mean radius and $w$ is the angular velocity of the impeller wheel.

The torque on the sensing wheel 18 is then:

$$T = F\bar{r} = \rho Q \bar{r}^2 w \quad (4)$$

where Q is the volumetric flow rate through all chambers in the sensing wheel 18.

But $\rho Q$ is the mass flow rate $\dot{M}$. Therefore the torque on sensing wheel 18 is directly proportional to the mass flow rate and the angular velocity of the impeller wheel 14.

Generally speaking it is the primary object of the invention to display this mass flow rate on a suitable indicator. In order to accomplish this conveniently the torque signal must be transduced into an electrical signal which is then transmitted to a remotely located indicator 21. Indicator 21 may be of the moving coil type. Many suitable voltage indicating devices are commercially available and therefore need not be described herein in detail.

To derive a voltage proportional to the torque on the sensing wheel 18, a torque balance between the torque from a torque motor 22 and the sensing wheel torque is made by adjusting the voltage $E_0$ applied to torque motor 22 until balance is obtained. This balance is achieved by using the unbalanced torque to rotate the sensing wheel 18 and an angular position sensing means 24 by means of gears 23 and 25. The position sensing means 24 is adapted to produce an output signal proportional to angular position. A rotational type potentiometer may be employed as the position sensing means 24. The voltage from sensing means 24 is amplified by amplifier 26 and applied in turn to motor 22. The torque motor 22 will rotate to a position wherein the amplified output of sensing means 24 is of sufficient magnitude and proper polarity to cause the motor torque to just balance the fluid flow torque. The voltage $E_0$ is therefore proportional to mass flow rate and if indicator 21 is chosen to have a response proportional to $E_0$ the indication will be proportional to the mass flow rate.

In aircraft applications it is convenient to operate synchronous motor directly from the aircraft power supply which is nominally 115 volts 400~ approximately plus or minus 10%. Since the speed of a synchronous motor is a function of line frequency the angular momentum imparted to the fluid will vary as the frequency. The torque imparted to the sensing wheel by the fluid is directly proportional to the mass flow rate and the angular velocity of the impeller wheel 14. Therefore, the torque motor 22 will drive the sensing wheel to a position at which the angular position sensing means 24 produces an output voltage proportional to the torque on the sensing wheel and the torque motor 22 produces a torque substantially equal and opposite the imparted torque. Since the torque varies as the frequency varies, the output voltage of the angular position sensing voltage output means 24 will vary in response to variation of the supply frequency. Since the indicator is responsive to the output voltage of voltage output means 24, the indicator reading will include an error because of the variation in the frequency of the supply voltage. As a compensation means there is employed a frequency sensitive voltage varying means 30, shown as an R-C phase shift network composed of resistor 32 and capacitor 34. The frequency sensitive means 30 is interposed between the voltage output means 24 and the indicator 21 so as to vary the output voltage in accordance with the frequency of the signal whereby the indicator provides an indication independent of the frequency of the power supply voltage.

The conventional engineering solution to the problem introduced by the varying frequency would be the use of a stabilized power source, a heavy, bulky and expensive device, but one which is commonly employed. It is indeed a unique solution to apply a simple, light-weight and inexpensive resistance-capacitance network that can accomplish the same result.

As discussed above the device is capable of measuring flow in but one direction. In a typical application for the device it is desired to register the amount of fuel consumed so that the indicator 21 serves as a quantity gage. For bi-directional use it is necessary to provide a second impeller wheel 38 which is coupled to impeller wheel 14 by means of gears 40, 41, 42 and 43 and shafts 44 and 45. Gears 41 and 42 serve to reverse the direction of rotation of impeller wheel 38. This permits the use of but one motor to drive both impeller wheels. Two separate motors may also be used. Where quantity indication is desired indicator 21 should be of the differential integrating type.

The number of vanes employed in impeller and sensing wheels should differ by some number other than a multiple so as to avoid locking in between wheels as is common in fluid drive mechanisms.

It is to be understood that the inside of housing 10 closely surrounds impeller wheels 14 and 38 and sensing wheel 16 and that the auxiliary equipment such as motors 12 and 22 and sensing means 24 fit into cavity 50 and gears 40, 41, 42 and 43 fit into cavity 52. Thus virtually the entire liquid flow is directed through vanes 16 of the respective wheels.

It will be understood that the invention can be used for different purposes or carried out in different ways by other forms of apparatus than described herein, and it is not intended to limit the scope of the invention to the specific arrangements described or otherwise than by the terms of the appended claims.

What is claimed is:

1. In an apparatus for measuring the mass flow rate of a flowing fluid adapted to be energized by a source of A.C. power including a rotatable vane type first impeller wheel; a synchronous motor, adapted to be energized from the source of A.C. power, coupled to said impeller wheel; a vane type sensing wheel; means for supporting said impeller wheel and said sensing wheel coaxially in juxtaposition; conduit means for directing said flowing fluid, in turn, through said impeller wheel and said sensing wheel so that rotation of the impeller wheel imparts to said fluid angular momentum whereby said sensing wheel has exerted upon it, by the resulting angularly accelerated fluid, a torque related to the mass flow rate of said flowing fluid and the angular velocity of said impeller wheel, the improvement comprising: angular position measuring voltage output means coupled to said sensing wheel so as to provide an output voltage related to the angular position of said sensing wheel, a torque motor coupled to said sensing wheel; means electrically connecting said torque motor with said angular position detecting voltage output means whereby said torque motor is under the control of said angular position detecting voltage output means so as to act on said sensing wheel with a torque substantially equal and opposite said torque exerted on said sensing wheel by said fluid; and indicating means, for indicating said flow rate, electrically connected to said angular position detecting voltage output means and under the control thereof.

2. The apparatus of claim 1 including a frequency sensitive voltage varying means interposed between said angular position detecting voltage output means and said indicating means, said frequency sensitive voltage varying means being adapted to vary the said output voltage to compensate for variation in the frequency of the A.C. power source.

3. The apparatus of claim 2 wherein said frequency sensitive voltage varying means comprises a resistor in cascade with said angular position detecting voltage output means and said indicating means and a capacitor in shunt connection with said resistor.

4. A bidirectional integrating type mass flowmeter for measuring the quantity of a flowing fluid and adapted to be energized by a source of A.C. power including a rotatable vane type first impeller wheel; a synchronous motor, adapted to be energized from the source of A.C. power, coupled to said impeller wheel; a vane type sensing wheel; means for supporting said impeller wheel and said sensing wheel coaxially in juxtaposition; conduit means for directing said flowing fluid, in turn, through said impeller wheel and said sensing wheel so that rotation of the impeller wheel imparts to said fluid angular momentum whereby said sensing wheel has exerted upon it, by the resulting angularly accelerated fluid, a torque related to the mass flow rate of said flowing fluid and the angular velocity of said impeller wheel; angular position measuring voltage output means coupled to said sensing wheel so as to provide an output voltage related to the angular position of said sensing wheel; a torque motor coupled to said sensing wheel; means electrically connecting said torque motor with said angular position detecting voltage output means whereby said torque motor is under the control of said angular position detecting voltage output means so as to act on said sensing wheel with a torque substantially equal and opposite said torque exerted on said sensing wheel by said fluid; a second impeller wheel mounted coaxially with said first impeller wheel and adjacent to said sensing wheel with said sensing wheel interposed between said first and said second impeller wheels; a gear train coupling said first and said second impeller wheels so as to contrarotate said second impeller wheel with respect to said first impeller wheel; integrating indicating means connected to said angular position detecting voltage output means, said indicating means being responsive to said output voltage so as to provide an indication of the difference in quantity of fluid passing through said sensing wheel from said first impeller wheel and the quantity of fluid passing through said sensing wheel from said second impeller wheel.

5. In a bidirectional apparatus for measuring the mass flow rate of a flowing fluid and adapted to be energized by a source of A.C. power including a rotatable vane type first impeller wheel; a synchronous motor, adapted to be energized from the source of A.C. power, coupled to said impeller wheel; a vane type sensing wheel; means for supporting said impeller wheel and said sensing wheel coaxially in juxtaposition; conduit means for directing said flowing fluid, in turn, through said impeller wheel and said sensing wheel so that rotation of the impeller wheel imparts to said fluid angular momentum whereby said sensing wheel has exerted upon it, by the resulting angularly accelerated fluid, a torque related to the mass flow rate of said flowing fluid and the angular velocity of said impeller wheel; angular position measuring voltage output means coupled to said sensing wheel so as to provide an output voltage related to the angular position of said sensing wheel; a torque motor coupled to said sensing wheel; means electrically connecting said torque motor with said angular position detecting voltage output means whereby said torque motor is under the control of said angular position detecting voltage output means so as to act on said sensing wheel with a torque substantially equal and opposite said torque exerted on said sensing wheel by said fluid; a second impeller wheel mounted coaxially with said first impeller wheel and adjacent to said sensing wheel with said sensing wheel interposed between said first and said second impeller wheels; a gear train coupling said first and said second impeller wheels so as to contrarotate said second impeller wheel with respect to said first impeller wheel; indicating means connected to said angular position detecting voltage output means, said indicating means being responsive to said output voltage so as to provide an indication of the mass flow rate of fluid passing through said sensing wheel.

6. The apparatus of claim 5 including a frequency sensitive voltage varying means interposed between said angular position detecting voltage output means and said indicating means, said frequency sensitive voltage varying means being adapted to vary the said output voltage to compensate for variation in the frequency of the A.C. power source.

References Cited in the file of this patent

UNITED STATES PATENTS

| | | |
|---|---|---|
| 789,110 | Warren | May 2, 1905 |
| 1,152,952 | Kepka | Sept. 7, 1915 |
| 2,183,078 | Kemler | Dec. 12, 1939 |
| 2,231,702 | Burgwin et al. | Feb. 11, 1941 |
| 2,361,173 | Browne | Oct. 24, 1944 |
| 2,601,780 | Baecher | July 1, 1952 |
| 2,605,638 | Pearson | Aug. 5, 1952 |
| 2,714,310 | Jennings | Aug. 2, 1955 |
| 2,769,337 | Rich | Nov. 6, 1956 |

FOREIGN PATENTS

| | | |
|---|---|---|
| 717,897 | Great Britain | Nov. 3, 1954 |